(12) United States Patent
Garvey (10) Patent No.: US 11,449,482 B2
(45) Date of Patent: Sep. 20, 2022

(54) DYNAMIC LOG LEVEL WITH AUTOMATIC RESET

(71) Applicant: ADP, LLC, Roseland, NJ (US)

(72) Inventor: Stephen Dale Garvey, Alpharetta, GA (US)

(73) Assignee: ADP, Inc., Roseland, NJ (US)

( * ) Notice: Subject to any disclaimer, the term of this patent is extended or adjusted under 35 U.S.C. 154(b) by 650 days.

(21) Appl. No.: 16/441,741

(22) Filed: Jun. 14, 2019

(65) Prior Publication Data

US 2020/0394167 A1 Dec. 17, 2020

(51) Int. Cl.
*G06F 16/22* (2019.01)
*G06F 12/0815* (2016.01)

(52) U.S. Cl.
CPC ...... *G06F 16/2228* (2019.01); *G06F 12/0815* (2013.01); *G06F 2212/608* (2013.01)

(58) Field of Classification Search
CPC .................................................. G06F 16/2228
USPC ....................................................... 707/736
See application file for complete search history.

(56) References Cited

U.S. PATENT DOCUMENTS

| | | | |
|---|---|---|---|
| 2007/0225943 A1* | 9/2007 | Marano | G06F 11/3636 702/182 |
| 2013/0086429 A1* | 4/2013 | Ng | G06F 11/0781 714/38.1 |
| 2016/0179646 A1* | 6/2016 | Neve De Mevergnies | G06F 11/25 714/30 |

* cited by examiner

*Primary Examiner* — Syling Yen
(74) *Attorney, Agent, or Firm* — Patrick J. Daugherty; Daugherty & Del Zoppo Co. LPA (57) ABSTRACT

Aspects define a dynamic threshold filter data structure that includes a pairing of an override log level value to a key value; in response to an incoming processing request, identify a user identification value that is linked to the request, wherein the user identification value is associated to a default logging level within a thread context map for logging data associated with executing processes in satisfaction of the processing request, and wherein the default logging level is different from the override log level; and in response to determining that the user identification value matches the key value, log data associated with executing processes in satisfaction of the processing request to the override log level.

9 Claims, 2 Drawing Sheets

DYNAMIC LOG LEVEL WITH AUTOMATIC RESET

BACKGROUND

Human resource management (sometimes "HRM" or "HR") generally refers to functions and systems deployed in organizations that are designed to facilitate or improve employee, member or participant performance in service of strategic objectives. HR comprehends how people are identified, categorized and managed within organizations via a variety of policies and systems. Human Resource management systems may span different organization departments and units with distinguished activity responsibilities. Human Resource Information Systems (HRIS) comprehend information technology (IT) systems and processes configured and utilized in the service of HR, and HR data processing systems which integrate and manage information from a variety of different applications and databases.

HR and other IT system management may comprehend logging utilities (applications, systems, components, frameworks, etc.) that use log files to record events, transactions and messages that occur in an operating system or other executing software application, or are exchanged between different users of a communication software application. Logging utilities generally use event logs to record events taking place in the execution of a system, which provide an audit trail that can be used to understand the activity of the system and to diagnose problems; transaction logs to record changes to stored database data that enable database recovery from crashes or other data errors, and maintenance of stored data in a consistent state; and message logs to log (save) textual communications between users.

Illustrative but not limiting or exhaustive examples of conventional logging utilities include Java®-based Apache® Log4j®; Pantheios, an open source C/C++ logging application programing interface (API) library; and "tinylog," a lightweight open-source logging framework for JAVA and Android™. (JAVA is a trademark of Oracle America, Inc., in the United States or other countries; APACHE and LOG4J are trademarks of the Apache Software Foundation in the United States or other countries; ANDROID is a trademark of Google LLC in the United States or other countries.)

SUMMARY

In one aspect of the present invention, a method includes a processor defining a dynamic threshold filter data structure that includes a first pairing of a first override log level value to a first key value; in response to an incoming processing request, identifying a user identification value that is linked to the request, wherein the user identification value is associated to a default logging level within a thread context map for logging data associated with executing processes in satisfaction of the processing request, and wherein the default logging level is different from the first override log level; and in response to determining that the user identification value matches the first key value, logging data associated with executing processes in satisfaction of the processing request to the first override log level.

In another aspect, a system has a hardware processor in circuit communication with a computer-readable memory and a computer-readable storage medium having program instructions stored thereon. The processor executes the program instructions stored on the computer-readable storage medium via the computer-readable memory and thereby defines a dynamic threshold filter data structure that includes a first pairing of a first override log level value to a first key value; in response to an incoming processing request, identifies a user identification value that is linked to the request, wherein the user identification value is associated to a default logging level within a thread context map for logging data associated with executing processes in satisfaction of the processing request, and wherein the default logging level is different from the first override log level; and in response to determining that the user identification value matches the first key value, logs data associated with executing processes in satisfaction of the processing request to the first override log level.

In another aspect, a computer program product has a computer-readable storage medium with computer-readable program code embodied therewith. The computer-readable program code includes instructions for execution which cause the processor to define a dynamic threshold filter data structure that includes a first pairing of a first override log level value to a first key value; in response to an incoming processing request, identify a user identification value that is linked to the request, wherein the user identification value is associated to a default logging level within a thread context map for logging data associated with executing processes in satisfaction of the processing request, and wherein the default logging level is different from the first override log level; and in response to determining that the user identification value matches the first key value, log data associated with executing processes in satisfaction of the processing request to the first override log level.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

Logging utilities generally allocate different amount of memory resources to different "logs" (data storage structures) for "logging" (storing) data associated with executing processes in satisfaction of a processing request based on differences in the kinds of events, transactions and messages stored thereto, or activities associated thereto. Illustrative but not exhaustive examples of built-in, default or conventional log levels with specified memory resource allocations are generally denoted in all caps and include the following:

FATAL: this log level is used to log data associated to severe errors that cause premature termination, wherein logged activity is generally immediately visible on a status console.

ERROR: used to log data associated to other, non-severe errors at runtime or unexpected conditions. ERROR logged activity is also generally immediately visible on a status console.

WARNING: used to log data associated to non-error events that are classified as "almost" errors, for runtime situations that are not errors but are undesirable or unexpected, for example, the use of deprecated APIs, or poor use of API. WARNING activity is also immediately visible on a status console.

INFO: this level is for non-error runtime events that are not undesirable or unexpected, but of (more) interest than other events, for example startup and shutdown events relative to other processing events. INFO activity is also generally immediately visible on a console, but at a conservative, lower or more minimum notice level relative to FATAL, ERROR and WARNING event activity.

DEBUG: this level is used to log detailed information on the flow through the system. DEBUG activity is generally not immediately visible on a console, but is written to logs only, and is generally allocated more memory resources to accommodate the logged information, relative to FATAL, ERROR, WARNING or INFO activity.

TRACE: this level is used to track more detailed information, and accordingly has higher memory resource allocations relative to DEBUG, FATAL, ERROR, WARNING or INFO activity. TRACE activity is generally not immediately visible on a console, but is written to logs only.

Logging utilities may also provide source code generator tools is to create loggers that support custom log levels that are similar to built-in log levels, and wherein such custom log levels can either complement or replace built-in log levels.

Inefficiencies commonly arise with respect to log resource allocation and management within conventional logging utilities. More particularly, default, standard or "normal" amounts of memory resources are generally allocated to each log level that are differentiated and chosen to be large enough to be sufficient to meet, while not exceeding, anticipated logging needs for associated events. However, if a default, normal amount of memory allocation to a given log level is set too high, the amount of log output will require a lot of storage, and corresponding increased expenditures of memory resources and costs, and may be more difficult to use for trouble shooting. Accordingly, it is desirable to use the minimum amount of memory allocations that are necessary to meet the anticipate need of each log level.

A higher, DEBUG or TRACE log level may be temporarily needed for processing requests for certain users for a period of time, such as in order to trouble-shoot a problem, wherein a normal level otherwise allocated to processing the request (such as for FATAL, ERROR, WARNING or INFO log levels) will not meet the needs of the trouble-shooting process. While conventional logging utilities enable administrators to temporarily increase logging levels to meet temporary increases in demand, this is a manual process that requires active intervention by an administrator, and further active management and oversight activities are required to reset an increased log level back to a normal level after the need for greater resources are over (for example, after a trouble shooting process or time period has ended). Without active oversight and intervention by an administrator in conventional logging utility operations, a "temporarily" raised log level will remain raised, sometimes well after the need for the raised levels has ended. Often, an administrator performing trouble shooting raises logging levels, and then forgets or otherwise neglects to timely lower them again after they have finished trouble shooting, resulting in negative impacts on overall system performance and cost efficiencies from processing increased DEBUG or TRACE data logging levels that are higher than warranted for current, normal logging needs, in proportion to the overall time that they remain unnecessarily raised (until they are subsequently lowered back to a normal, more efficient allocation at the end of the associated event).

Aspects of the present invention provide methods, systems, processes and computer-readable storage medium solutions that use thread context mapping to autonomously differentiate the allocation of thread levels to users. Aspect provide efficient and easily-enabled mechanisms that adjust log levels to meet the specific needs of specific users on a dynamic basis, automatically raising them to meet heightened needs in response to incoming requests, and then automatically restoring them back to their original, lower levels after the need has passed, thereby providing processing and resource allocation advantages over conventional logging utility configurations.

More particularly, logging utilities may manage multiple clients simultaneously. Thus, different threads may handle different clients in some multithreaded implementations. Logging is especially well suited to trace and debug complex distributed applications. A common, conventional approach to differentiate the logging output of one client from another is to instantiate a new separate logger for each client. However, this promotes the proliferation of loggers and increases the management overhead of logging.

Figure 1:
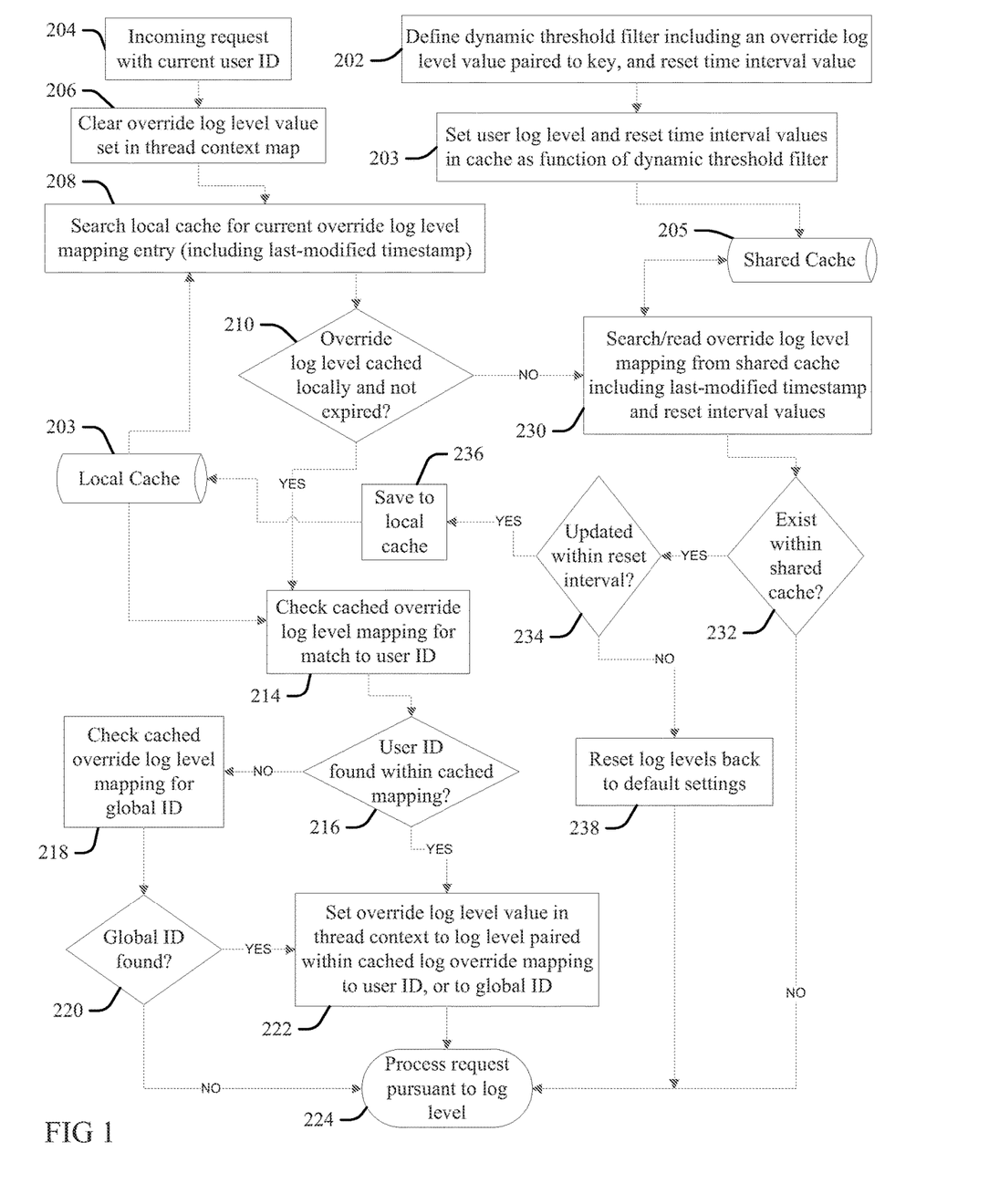
FIG. 1 is a flow chart illustration of a method or process aspect according to an embodiment of the present invention.

In contrast, by using thread context mapping to differentiate the allocation of thread levels by user, embodiments of the present invention provide resource and processing efficiencies over instantiating new separate loggers for each client and other conventional approaches. FIG. 1 illustrates an exemplary embodiment according to the present invention. While the present example refers to terms and structures via naming conventions defined within a LOG4J logging utility, it will be appreciated by one skilled in the art that the present example is not limiting, and other embodiments may be configured for and deployed within other logging utilities, wherein the terms used may vary based on the needs of said alternative (non-LOG4J) logging utilities.

Thus, at 202 a processor configured according to the present invention (the "configured processor") defines (generates, creates, etc.) a "dynamic threshold filter" data structure that comprises an "override log level" value that is paired to key value, and a reset time interval value, in a shared resource that is accessible from all containers: for example, in a "DynamicThresholdFilter" in a LOG4J configuration file. More particularly, the dynamic threshold filter is a logging utility configuration that provides that that whenever a "thread context map" value ("ThreadContext" in LOG4J) for a user has an "override log level" value set to one of the keys defined in the filter, then the log level for that user should be set to the corresponding filter value on the thread. For example, setting an "overrideLogLevel="TRACE"" in LOG4J results in over-riding another current or default level (for example, "INFO" or "DEBUG") to set the level to TRACE, in response to matching the key value paired to TRACE within the LOG4J "DynamicThresholdFilter."

Some embodiments define the dynamic threshold filter at 202 by using REST (Representational State Transfer) API calls to take the following values from a structured data input (for example, JSON (JavaScript® Object Notation), XML (extensible mark-up language), etc.) (JAVASCRIPT is a trademark of Oracle America, Inc., in the United States or other countries.):

(i) a list of user ID (identification)/log level pairs; in some embodiments an asterisk ("*") or other wildcard denotation is passed as a global user ID value that is applicable to all users that do not have log levels paired to their specific user IDs, in which case the corresponding log level paired to the global value is used as an override log level for such users (those without pairing to their specific user ID in the list); and (ii) a reset time interval after which the overridden log levels should be reset to their normal values. More particularly, embodiments set and use the reset time interval value to ensure that log levels that have been temporarily changed are automatically reset back to their default or original values. Generally, the override levels provide for larger memory resources need to log activity associated with debug, trace or other trouble shooting operations; however, embodiments may set override levels to lower levels and lower corresponding memory resource allocations, as deemed appropriate by a system administrator. Illustrative but not limiting or exhaustive examples of the reset time interval value include 15 mins, thirty minutes, 60 minutes, etc.

Examples of REST API calls used by aspects of the present invention at 202 to acquire user ID and log level pair values include "PUT" and "GET" calls, and still other appropriate calls will be apparent to one skilled in the art.

At 203 the configured processor maps user logs levels saved to a shared cache 205 resource to the dynamic threshold filter, thereby setting the user log levels as a function of matching to the log level and user ID key value pairings and the associated reset time interval values defined by the dynamic threshold filter. The shared cache 205 resource is external to local memory devices (RAM memory, etc.) of the configured processor. Illustrative but not limiting or exhaustive examples of the shared cache 205 resource include Redis, MongoDB or other database or data storage device, cloud service or other data repositories. Redis is an open source, in-memory data structure store provided by Redis Labs that may be used as a database, cache and message broker, and that supports data structures including strings, hashes, lists, sets, sorted sets with range queries, bitmaps, hyperloglogs, geospatial indexes with radius queries and streams. MongoDB is a cross-platform document-oriented database program developed by MongoDB Inc. that is classified as a NoSQL ("not only SQL," wherein SQL stands for "Structured Query Language") database program and uses JSON-types of documents with schemata. JSON is an open-standard file format that uses human-readable text to transmit data objects consisting of attribute-value pairs and array data types.

Providing the shared cache 205 enables items to be added and identified using key/value pairs, wherein the filter mechanism provides for log events to be evaluated as a function of the filter. Thus, if a user's unique identification is captured in a thread context map, then application of the dynamic threshold filter in setting user log values saved to the shared cache enables an override setting to debug logging for only that user, wherein if the log event does not contain such a specified thread context map item then the override setting is not applied (for example, "NEUTRAL" is returned). Thus, the dynamic threshold filter uses key value pair parameter values (for example, "KeyValuePair[ ]") to define matching values for the key and the level that are evaluated and used to set dynamically changing log levels for each user: one value when the key matches, another value when it does not match.

In implementation, in response to an incoming (API) request that is associated to a specific user (includes a user ID) at 204, at 206 the configured processor clears any "override log level" value currently set in a thread context map (thus, in "ThreadContext" of LOG4J), and at 208 searches a local cache 203 for (and reads if found) a current override log level mapping that includes a last-modified timestamp for the current log level. The local cache 203 is a portion of random access memory (RAM) that is allocated to the configured processor for executing operating systems, applications, etc.

At 210 the configured processor determines whether any override log level mapping entry has been found within the local cache 203; and also, if found, whether it has expired, namely, determining whether an elapsed time since the last-modified timestamp exceeds an expiration time (expiry) interval value that is defined for checking and refreshing the override log level mappings. Expiry times may be set by an administrator to any time period deemed likely or relevant to ensure that the override log level entry currently cached is not stale, that it has not been updated since it was cached. Illustrative but not exhaustive examples of expiry times include ten (10) seconds, fifteen (15) seconds, one minute, five (5) minutes, etc.

Some embodiments dynamically set, tune or update the expiry time as a function of current system attributes: for example, increasing the expiry time to reduce the frequency of checks for updates when resources are limited or more costly, and decreasing the expiry time period to perform more or more frequent checks for updates, in order to increase reliance on the version selected for execution (as discussed below) when resources are less limited or costly. Illustrative but not limiting or exhaustive examples of resources considered in setting the expiration time include current or projected network communication or memory bandwidth availability, current or projected processing costs, time of business day (peak business hours or late-night or low-demand time periods), and still other considerations will be apparent to one skilled in the art.

In response to determining at 210 that an override log level mapping is found within the local cache 203 and that it has not expired (condition "Yes"), at 214 the configured processor determines whether the used ID of the request at 204 is present within a key-value pair of the override log level mapping. More particularly, the override log level mapping may have a plurality of key-value pairs of different user IDs and respective override levels: for example, a first user ID may be paired to a DEBUG level in the override mappings, while a different, second user ID may be paired to a TRACE level.

In response to determining at 216 that the user ID is not found within a key value pair of the cached override log level mapping (condition "No"), at 218 the configured processor determines whether a global ID value (for example, an asterisk or other generic or wildcard symbol) is present within a key-value pair of the override log level mapping. As discussed above, a global ID value may be mapped within a key-value pair to an override level that is applicable for all user IDs that are not specifically mapped to a key value pair of the cached override log level mapping: for example, defining a default override level of DEBUG level for processing the request at 204 for all users that do not have other value mapped to their user ID as determined at 216.

Thus, at 222 the configured processor sets the override log level value in thread context to the log level paired within cached log override mapping to the user ID (condition "Yes" at 216), and alternatively (condition "No" at 216) to the log level paired to any global ID found at 220, wherein the override log level thus set is applied in processing the request at 224.

Otherwise, in response to determining at 216 that the user ID is not found within a key value pair of the cached override log level mapping (condition "No"), and that no global ID is found (condition "No" at 220), then no override level is set and the request is processed at 224 at the normal or default log level for the user and the request.

Returning to the process at 210, in response to determining at 210 that either an override log level mapping is not found within the local cache 203, or that an override log level mapping is found within the local cache 203 but that it has expired (condition "No"), at 230 the configured processor searches the shared cache 205 for an override log level mapping, and if found, reads the mapping, including reset interval and last-modified (updated) timestamp values of the read mapping.

In response to determining that no override log level mapping is found within the shared cache 205 ("No" condition at 232), the configured processor moves on to process the request at 224 at the current (default) log level specified for the request and user, without overriding or otherwise changing the default log level. Alternatively, in response to finding an override log level mapping within the shared cache 205 ("Yes" condition at 232), at 234 the configured processor determines whether the override log level mapping found within the shared cache 205 has been updated within the reset interval read from said mapping: whether a time elapsed since the value of last-modified timestamp read from the override log level mapping read from the shared cache 205 is less than the reset interval value read from said shared cache 205 mapping.

In response to determining at 234 that the override log level mapping found within the shared cache 205 has been updated within (more recently than the lapse of) the reset interval ("Yes" condition), at 236 the configured processor saves the override log level mapping read from the shared cache 205 to the local cache 203 for use in determining whether an override level is mapped to the user ID at 214, as discussed above. Thus, as the configured processor has determined that the mapping values found in the shared cache 205 are not stale, that they have not expired relative to the reset interval, the mapping is stored to the local cache at 236 for use in selectively changing current default log levels for the user in processing the request at 224, via the application of the appropriate intervening processes 216, 218, 222, and 222; and for each of subsequent iterations, so long as the expiry and reset time interval value comparisons are again satisfied at 210 and 234.

Otherwise, in response to determining at 234 that the override log level mapping found within the shared cache 205 has not been updated within the reset interval ("No" condition), at 238 the configured processor resets the log levels back to their default settings, removing all users shared cache user log level entry. Resetting the log levels at 238 may further comprise deleting override log level mappings from, and otherwise saving reset data to, the shared cache 203 and the local cache 205. Thus, processing of the request at 224 is now pursuant to the default log level settings for the request at 204.

As further indicated by FIG. 1, where the configured processor does not find override log level data applicable to the user within either of the local cache 203 or the shared cache 205 (condition "No" at 210 is combined with a condition "No" at 232), the configured processor processes the request at 224 pursuant to the default, current level settings for the request and the user at 204, responsive to clearing any "override log level" value currently set in a thread context map at 206.

Some aspects dynamically define or set the reset interval as a function of application component and/or system attributes, to ensure that the log levels are reset at 238 back to their default levels after a time period for which it is probable or likely that the enhanced, higher memory resource usage associated with the override log levels are no longer needed. In one example, the configured processor defines, sets or applies a reset interval of at 234 of fifteen (15) minutes, in response to determining that historical debugging, tracing or other activities associated with processing the request at 224 is unlikely to take more than 15 minutes to complete, and thus that any increased log levels should be reset back to their default, lower levels in order to provide resource efficiency advantages after the expiration of the 15 minute reset interval.

Embodiments of the present invention adjust log levels on all containers running service or application code, thereby ensuring coverage for any container that requires trouble shooting. Since it generally impractical or impossible to predict which containers will get used while trouble shooting, such embodiments provide resilience and reliability advantages by assuring effective coverage of all containers, relative to conventional systems.

Embodiments of the present invention provide two different, independent means for efficiently allocating (limiting) resources expended on executing various containers or components of an application at run-time: limiting the expenditure of resources to check for more current versions of override log level mappings to executions that have not been already checked at least an expiration time period from the current time, as determined at 210; and further only expending resources to refresh the locally-cached versions of override log level mappings in response to confirming that a more recent version exists in the shared cache 205, as determined at 234. As run-times are quicker and more efficient via use of local cache 203 structures relative to external, shared cache 205 resources, this provides direct efficiencies in proportion to the amount of shared cache read and transformation operations avoided that would otherwise be performed in conventional logging utility systems.

Figure 2:
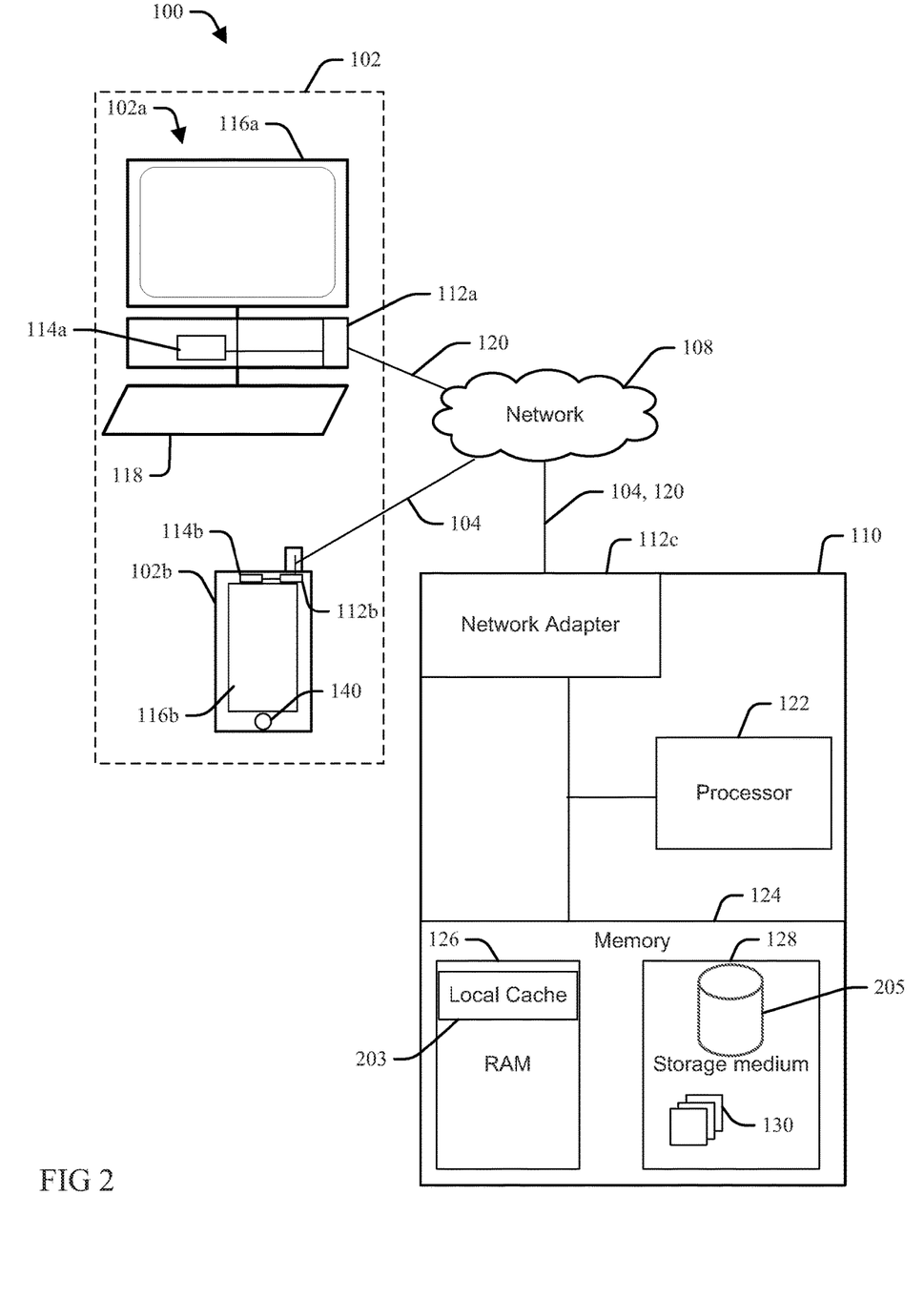
FIG. 2 is a graphic illustration of an example of an implementation according to an embodiment of the present invention.

FIG. 2 is a schematic, graphic illustration of an embodiment of a system 100 according to the present invention. The system 100 includes one or more local computing devices 102, such as, for example, a desktop computer 102a or smartphone 102b; other examples includes a laptop computer, personal digital assistant, tablet, cellular telephone, body worn device, or the like. Lines of the schematic illustrate communication paths between the devices 102a, 102b and a computer server 110 over a network 108, and between respective components within each device. Communication paths between the local computing devices 102a and 102b and the computer server 110 over the network 108 include respective network interface devices 112a, 112b, and 112c within each device, such as a network adapter, network interface card, wireless network adapter, and the like.

In one example, the smartphone 102b routes an incoming request 104 comprising a user ID (including in response to an input through a GUI display device 116b, or a verbal command received via a microphone 140) over a network 108 to a logging utility executing on a computer server 110 via their respective network interface adapters 112b and 112c. The computer server 110 includes a processor 122 configured (thus, the "configured processor" discussed above with respect to FIG. 1) with instructions stored in a memory 124. The processor 122 of the computer server 110 and the processors 114a and 114b of the local computing devices include, for example, a digital processor, an electrical processor, an optical processor, a microprocessor, a single core processor, a multi-core processor, distributed processors, parallel processors, clustered processors, combinations thereof and the like. The memory 124 includes a computer-readable random access memory (RAM) 126 comprising a local cache portion 203 as discussed above, and a computer-readable storage medium 128.

As described above with respect to FIG. 1, the computer server 110 identifies the user identification value linked to the request 104, and selects (arbitrates between) different default and override log levels for logging data associated with executing processes and providing return data 120 in satisfaction of the processing request 104, responsive to matching the user identification value to key values paired respectively thereto, and to determining whether elapsed times from respect last-modified timestamps meet expiration and reset time vale thresholds, communicating resultant data via their respective network interface adapters 112c and 112a.

The local computing devices 102 include one or more input devices 118, such as a keyboard, mouse, microphone, touch screen, etc., and wherein the processor 114a drives display devices 116a to present data values as described above with respect to FIG. 1. The computer-readable storage medium 128 can be a tangible device that retains and stores instructions for use by an instruction execution device, such as the processor 122. The computer-readable storage medium 128 may be, for example, but is not limited to, an electronic storage device, a magnetic storage device, an optical storage device, an electromagnetic storage device, a semiconductor storage device, or any suitable combination of the foregoing.

A computer-readable storage medium 128 includes the shared cache 205 described above and as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be transmitted to respective computing/processing devices from the computer-readable storage medium 128 or to an external computer or external storage device via the network 108. The network 108 can include private networks, public networks, wired networks, wireless networks, data networks, cellular networks, local area networks, wide area networks, the Internet, and combinations thereof. The network interface devices 112a, 112b and 112c in each device exchange (receive and send) computer-readable program instructions from and through the network 108 and, include storage in or retrieval from the computer-readable storage medium 128.

Computer-readable program instructions for carrying out operations of the present invention may include assembler instructions, instruction-set-architecture (ISA) instructions, machine instructions, machine dependent instructions, microcode, firmware instructions, state-setting data, configuration data for integrated circuitry, compiled or interpreted instructions, source code or object code written in any combination of one or more programming languages or programming environments, such as Java®, Javascript®, C, C #, C++, Python, Cython, F #, PHP, HTML, Ruby, and the like. (JAVA and JAVASCRIPT are trademarks of Oracle America, Inc., in the United States or other countries.)

The computer-readable program instructions may execute entirely on the computer server 110, partly on the computer server 110, as a stand-alone software package, partly on the computer server 110 and partly on the local computing devices 102 or entirely on the local computing devices 102. For example, the local computing devices 102 can include a web browser that executes HTML instructions transmitted from the computer server 110, and the computer server executes JAVA instructions that construct the HTML instructions. In another example, the local computing devices 102 include a smartphone application, which includes computer-readable program instructions to perform the processes described above.

The memory 124 can include a variety of computer system readable media. Such media may be any available media that is accessible by computer server 110, and the media includes volatile media, non-volatile media, removable, non-removable media, and combinations thereof. Examples of the volatile media can include random access memory (RAM) and/or cache memory. Examples of non-volatile memory include magnetic disk storage, optical storage, solid state storage, and the like. As will be further depicted and described below, the memory 124 can include at least one program product having a set (e.g., at least one) of program modules 130 that are configured to carry out the functions of embodiments of the invention.

The computer system 100 is operational with numerous other computing system environments or configurations. Examples of well-known computing systems, environments, and/or configurations that may be suitable for use with computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine ("a configured processor"), such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one aspect, a service provider may perform process steps of the invention on a subscription, advertising, and/or fee basis. That is, a service provider could offer to integrate computer-readable program code into the computer system 100 to enable the computer system 100 to perform the processes of FIG. 1 discussed above. The service provider can create, maintain, and support, etc., a computer infrastructure, such as components of the computer system 100, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 110, from a tangible computer-readable medium device 128; (2) adding one or more computing devices to the computer infrastructure 100; and (3) incorporating and/or modifying one or more existing systems 110 of the computer infrastructure 100 to enable the computer infrastructure 100 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply any precedence, ordering or ranking of any claim elements, limitations or process steps.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   defining a dynamic threshold filter data structure to comprise a reset time interval value, a last-modified timestamp value, a first pairing of a first override log level value to a first key value, and a second pairing of a second override log level value to a global key value;
   in response to an incoming processing request, identifying a user identification value that is linked to the request, wherein the user identification value is associated to a default logging level within a thread context map for logging data associated with executing processes in satisfaction of the processing request, and wherein the default logging level is different from the first override log level;
   in response to determining that the user identification value matches the first key value and that a time elapsed since the last-modified timestamp value does not exceed the reset time interval value, logging data associated with executing processes in satisfaction of the processing request to the first override log level;
   logging data associated with executing processes in satisfaction of the processing request to the second override log level in response to determining that the user identification value does not match the first key value, and to determining that the time elapsed since the last-modified timestamp value does not exceed the reset time interval value;
   storing the first pairing of the first override log level value to the first key value, the reset time interval value and the last-modified timestamp value in a local cache portion of a local random access memory device of a processor that is executing the processes in satisfaction of the processing request, wherein the determining that the user identification value matches the first key value or the global key value is dependent upon reading the first pairing stored within the local cache; and
   in response to determining that the time elapsed since the last-modified timestamp value exceeds the reset time interval value, deleting the first pairing from the local cache and logging the data associated with executing processes in satisfaction of the processing request to the default log level.

2. The method of claim 1, further comprising:
   replacing the first pairing with a revised version of the first pairing that is stored in a shared cache memory structure that is external to the local random access memory device and that is accessible from all of a plurality of different processing containers, in response to determining that the time elapsed since the last-modified timestamp value exceeds an expiration time value that is less than the reset time interval value, and to determining that a time elapsed since a last-modified timestamp value of the revised version of the first pairing does not exceed the reset time interval value.

3. The method of claim 2, further comprising:
in response to determining that the time elapsed since the last-modified timestamp value of the revised version of the first pairing exceeds the reset time interval value, removing all users from a user log level entry of the shared cache.

4. The method of claim 2, further comprising:
defining the dynamic threshold filter data structure within a LOG4J "DynamicThresholdFilter" code configuration; and
associating the user identification value to any one of the default logging level, the first override level and the second override level for executing the processes in satisfaction of the processing request via a LOG4J "ThreadCon text" code configuration.

5. A system, comprising:
a processor;
a computer-readable memory in circuit communication with the processor;
a computer-readable storage medium in circuit communication with the processor; and
wherein the processor executes program instructions stored on the computer-readable storage medium via the computer-readable memory and thereby:
defines a dynamic threshold filter data structure to comprise a reset time interval value, a last-modified timestamp value, a first pairing of a first override log level value to a first key value, and a second pairing of a second override log level value to a global key value;
in response to an incoming processing request, identifies a user identification value that is linked to the request, wherein the user identification value is associated to a default logging level within a thread context map for logging data associated with executing processes in satisfaction of the processing request, and wherein the default logging level is different from the first override log level;
in response to determining that the user identification value matches the first key value and that a time elapsed since the last-modified timestamp value does not exceed the reset time interval value, logs data associated with executing processes in satisfaction of the processing request to the first override log level;
logs data associated with executing processes in satisfaction of the processing request to the second override log level in response to determining that the user identification value does not match the first key value, and to determining that the time elapsed since the last-modified timestamp value does not exceed the reset time interval value;
stores the first pairing of the first override log level value to the first key value, the reset time interval value and the last-modified timestamp value in a local cache portion of a local random access memory device of a processor that is executing the processes in satisfaction of the processing request, wherein determining that the user identification value matches the first key value or the global key value is dependent upon reading the first pairing stored within the local cache; and
in response to determining that the time elapsed since the last-modified timestamp value exceeds the reset time interval value, deletes the first pairing from the local cache and logging the data associated with executing processes in satisfaction of the processing request to the default log level.

6. The system of claim 5, wherein the processor executes the program instructions stored on the computer-readable storage medium via the computer-readable memory and thereby:
replaces a version of the first pairing stored in the local cache with a revised version that is stored in a shared cache memory structure that is external to the local random access memory device and that is accessible from all of a plurality of different processing containers, in response to determining that the time elapsed since the last-modified timestamp value exceeds an expiration time value that is less than the reset time interval value, and to determining that a time elapsed since a last-modified timestamp value of the revised version of the dynamic threshold filter data does not exceed the reset time interval value.

7. The system of claim 6, wherein the processor executes the program instructions stored on the computer-readable storage medium via the computer-readable memory and thereby:
in response to determining that the time elapsed since the last-modified timestamp value of the revised version of the dynamic threshold filter data exceeds the reset time interval value, removes all users from a user log level entry of the shared cache;
defines the dynamic threshold filter data structure as a LOG4J "DynamicThresholdFilter" code configuration; and
associates the user identification value to any one of the default logging level, the first override level and the second override level for executing the processes in satisfaction of the processing request via a LOG4J "ThreadContext" code configuration.

8. A computer program product, comprising:
a computer-readable storage medium having computer-readable program code embodied therewith, wherein the computer-readable storage medium is not a transitory signal per se, the computer-readable program code comprising instructions for execution by a processor that cause the processor to:
define a dynamic threshold filter data structure to comprise a reset time interval value, a last-modified timestamp value, a first pairing of a first override log level value to a first key value, and a second pairing of a second override log level value to a global key value;
in response to an incoming processing request, identify a user identification value that is linked to the request, wherein the user identification value is associated to a default logging level within a thread context map for logging data associated with executing processes in satisfaction of the processing request, and wherein the default logging level is different from the first override log level;
in response to determining that the user identification value matches the first key value and that a time elapsed since the last-modified timestamp value does not exceed the reset time interval value, log data associated with executing processes in satisfaction of the processing request to the first override log level;
log data associated with executing processes in satisfaction of the processing request to the second override log level in response to determining that the user identification value does not match the first key value, and to determining that the time elapsed since the last-modified timestamp value does not exceed the reset time interval value;

store the first pairing of the first override log level value to the first key value, the reset time interval value and the last-modified timestamp value in a local cache portion of a local random access memory device of a processor that is executing the processes in satisfaction of the processing request, wherein determining that the user identification value matches the first key value or the global key value is dependent upon reading the first pairing stored within the local cache; and in response to determining that the time elapsed since the last-modified timestamp value exceeds the reset time interval value, delete the first pairing from the local cache and logging the data associated with executing processes in satisfaction of the processing request to the default log level.

9. The computer program product of claim 8, wherein the computer-readable program code instructions for execution by the processor further cause the processor to:

replace a version of the first pairing stored in the local cache with a revised version that is stored in a shared cache memory structure that is external to the local random access memory device and that is accessible from all of a plurality of different processing containers, in response to determining that the time elapsed since the last-modified timestamp value exceeds an expiration time value that is less than the reset time interval value, and to determining that a time elapsed since a last-modified timestamp value of the revised version of the dynamic threshold filter data does not exceed the reset time interval value;

in response to determining that the time elapsed since the last-modified timestamp value of the revised version of the dynamic threshold filter data exceeds the reset time interval value, remove all users from a user log level entry of the shared cache;

define the dynamic threshold filter data structure as a LOG4J "DynamicThresholdFilter" code configuration; and associate the user identification value to any one of the default logging level, the first override level and the second override level for executing the processes in satisfaction of the processing request via a LOG4J "ThreadContext" code configuration.

* * * * *